US012649643B2

(12) United States Patent
Zaguroli, Jr.

(10) Patent No.: US 12,649,643 B2
(45) Date of Patent: Jun. 9, 2026

(54) CRANE CABLE AND HOSE MANAGEMENT

(71) Applicant: Knight Industries & Associates, Inc., Auburn Hills, MI (US)

(72) Inventor: James Zaguroli, Jr., Auburn Hills, MI (US)

(73) Assignee: Knight Industries & Associates, Inc., Auburn Hills, MI (US)

( * ) Notice: Subject to any disclaimer, the term of this patent is extended or adjusted under 35 U.S.C. 154(b) by 252 days.

(21) Appl. No.: 18/217,124

(22) Filed: Jun. 30, 2023

(65) Prior Publication Data

US 2024/0425329 A1 Dec. 26, 2024

Related U.S. Application Data

(60) Provisional application No. 63/522,326, filed on Jun. 21, 2023.

(51) Int. Cl.
*B66C 13/14* (2006.01)
*B66C 19/00* (2006.01)

(52) U.S. Cl.
CPC .............. *B66C 13/14* (2013.01); *B66C 19/00* (2013.01)

(58) Field of Classification Search
CPC ......... B66C 13/12; B66C 13/14; B66C 19/00; B66C 13/10; F16L 3/012; H02G 11/02
See application file for complete search history.

(56) References Cited

U.S. PATENT DOCUMENTS 3,833,774 A * 9/1974 Mills ........................ B66C 13/12 137/355.16
11,267,350 B2 * 3/2022 Bünker .................... B60L 53/18
2013/0118840 A1 5/2013 Kalliomaki

FOREIGN PATENT DOCUMENTS

AU 579667 B2 12/1988
CN 100436300 C 11/2008
DE 711320 C * 9/1941 ............. B66C 13/12
DE 2347511 A1 4/1975
DE 102018122663 A1 * 3/2020 ............. B60L 53/14

OTHER PUBLICATIONS

DE 711320 Machine Translation. (Year: 1941).*
Extended European Search Report for European Application No. 23188790.2—1017 / 4480883 dated Jan. 5, 2024.

* cited by examiner

*Primary Examiner* — Robert W Hodge
*Assistant Examiner* — Juan J Campos, Jr.
(74) *Attorney, Agent, or Firm* — Carlson, Gaskey & Olds, P.C.

(57) ABSTRACT

A crane system includes a beam, a trolley movable along the beam, and a hoist supported by the trolley. A cable and/or a hose is connected with at least one of the hoist, the trolley, or a load supported by the hoist. A management system for the cable and/or hose includes a reel mounted in a position fixed against lateral movement and for receiving the cable or hose. A trough is mounted to the beam for supporting the cable or hose as the trolley moves along the beam.

18 Claims, 9 Drawing Sheets

CRANE CABLE AND HOSE MANAGEMENT

BACKGROUND

Crane systems are systems for material handling equipment used to lift and move loads in industrial, construction, and manufacturing settings.

Crane systems may include various cables and hoses for operation of the system. Festooning systems are known to be used to support, protect, and guide these cables and hoses as they move along the crane's structure. Festooning may prevent cable and hose entanglement, damage, or interference with the crane's movements. The festooning system allows the cables and hoses to smoothly move and adjust their length as the crane travels across the workspace or performs lifting and lowering operations.

SUMMARY

A crane system according to an example of this disclosure includes a beam, a trolley movable along the beam, and a hoist supported by the trolley. A cable and/or a hose is connected with at least one of the hoist, the trolley, or a load supported by the hoist. A management system for the cable and/or hose includes a reel mounted in a position fixed against longitudinal movement for receiving the cable or hose. A trough is mounted to the beam for supporting the cable or hose as the trolley moves along the beam.

In a further example of the foregoing, the trough is V-shaped in cross-section. In a further example of the foregoing, the trough includes ultra high molecular weight polyethylene.

In a further example of any of the foregoing, the cable or hose is a pneumatic hose.

In a further example of any of the foregoing, the management system includes a guide post extending in a direction transverse to the beam for guiding the cable and/or hose into the trough.

In a further example of any of the foregoing, the reel is substantially centrally located relative to the beam, and the trolley can move along the beam in a first direction away from the reel and in a second direction away from the reel, the second direction opposite the first direction, with the cable and/or hose remaining connected with the hoist, the trolley, and/or the load.

In a further example of any of the foregoing, the management system includes a load balancer includes a cable attached to the reel.

In a further example of any of the foregoing, the load balancer is mounted in a position fixed against longitudinal movement, the load balancer includes a counterbalance. The cable extends from the counterbalance, and an end of the cable is attached to the reel.

In a further example of any of the foregoing, the cable is attached to a cylinder extending from a barrel of the reel.

In a further example of any of the foregoing, the cylinder includes a helical groove for the cable to coil within.

In a further example of any of the foregoing, the load balancer is mounted to the beam.

In a further example of any of the foregoing, the reel is mounted to the beam.

In a further example of any of the foregoing, the beam provides an enclosed track, and the trolley includes a pad spring loaded to contact an interior surface of the beam.

A method of managing a hose or cable according to an example of this disclosure includes providing a trolley movable along a beam and a hoist supported by the trolley, mounting a reel in a position fixed against longitudinal movement, providing a hose or cable on the reel and connected with at least one of the hoist, the trolley, or a load supported by the hoist. The example method includes mounting a trough to the beam for receiving the hose or cable, and attaching a load balancer cable to the reel.

In a further example of the foregoing, the step of attaching the load balancer cable to the reel includes attaching the load balancer cable to a cylinder extending from a barrel of the reel.

In a further example of any of the foregoing, the step of mounting the reel includes mounting the reel to the beam.

In a further example of any of the foregoing, the trough is V-shaped in cross section.

In a further example of any of the foregoing, the method includes positioning a guide post, which includes a perch to direct the hose or cable into the trough.

In a further example of any of the foregoing, the positioning the guide post step includes mounting the guide post to the beam.

In a further example of any of the foregoing, the step of attaching the load balancer cable to the reel includes attaching the load balancer cable to a cylinder extending from a barrel of the reel, and the step of mounting the reel includes mounting the reel to the beam.

In a further example of any of the foregoing, the method includes mounting a guide post to the beam, the guide post includes a perch to direct the hose or cable into the trough.

These and other features may be understood from the following specification and drawings, the following of which is a brief description.

DETAILED DESCRIPTION

This application relates to crane systems, and more particularly to hose or cable management systems and methods for crane systems. The systems and methods disclosed herein have been found to be improvements over prior art festooning systems and methods.

Figure 1:
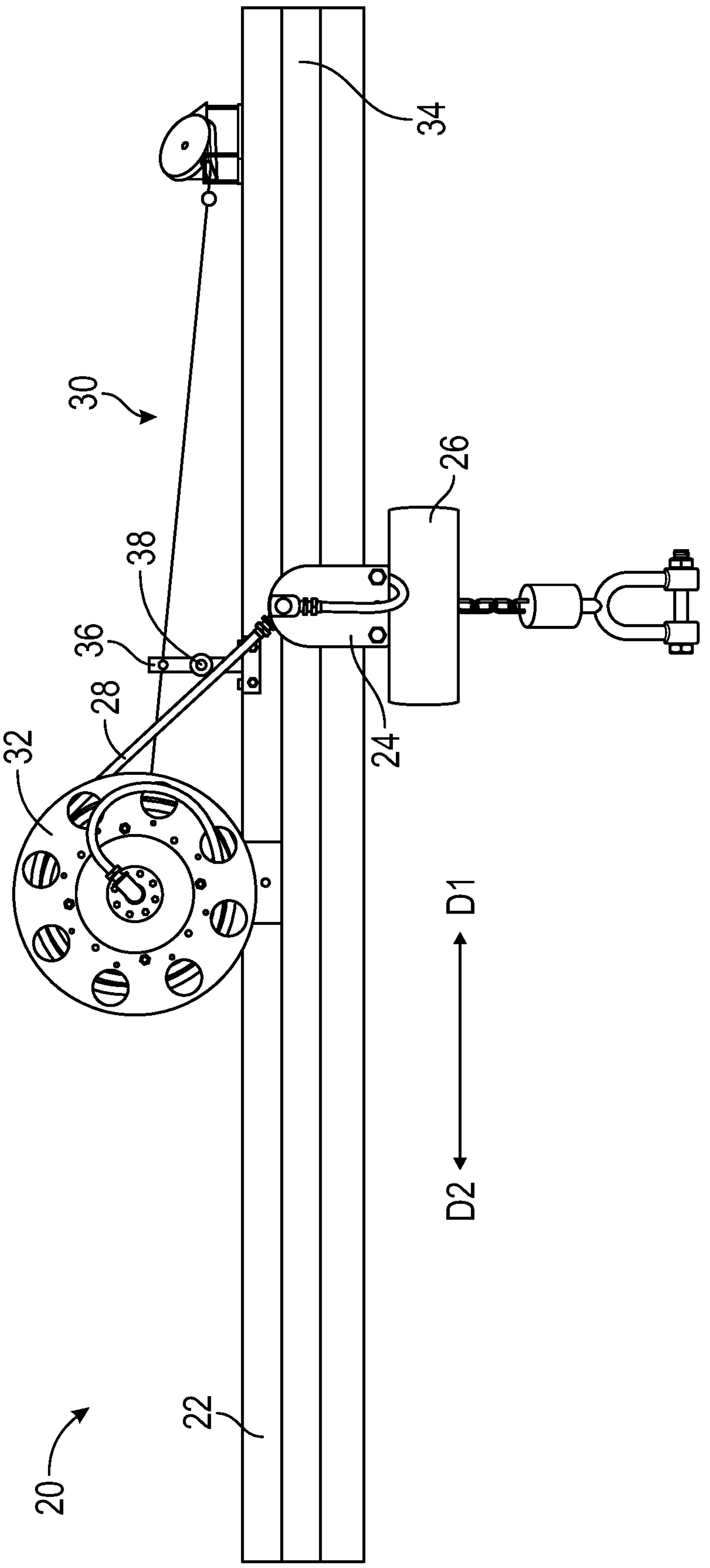
FIG. 1 illustrates an example crane system.

FIG. 1 illustrates an example crane system 20 including a beam 22, a trolley 24 movable along length of the beam 22 in directions D1 and D2, and a hoist 26 supported by the trolley 24. The beam 22 may provide a bridge or runway of the crane system 20 in some examples and provides a track for the trolley 24 to move along, such as to position the hoist 26 and/or load. The beam 22 may be arranged horizontally over a workspace in an industrial, construction, or manufacturing setting in some examples. Movement of the trolley 24 may be done manually and/or remotely in some examples. The trolley 24 may be motorized in some examples.

A cable or a hose 28 may be connected with one or more of the trolley 24, the hoist 26, or the load supported by the hoist 26, such as to provide power and/or control to the hoist 26 the load 26 in some examples. In the example shown, the hose 28 is a pneumatic hose, but other hoses and cables, including electrical cables, may be utilized and may benefit from this disclosure. As used herein, the term "hoist" is inclusive of any device used for lifting or lowering a load by means of a drum or lift-wheel around which cable, rope, chain, etc. wraps. The hoist 26 may be electric or pneumatic in some examples. Further, for purposes of this disclosure, the term "hoist" is defined to be inclusive of air balancers.

A hose or cable management system 30 includes a reel 32 mounted to the beam 22 for storing and dispensing the example hose 28. The example reel 32 is mounted such that the axis of rotation 33 (see FIG. 2) of the reel 32 is transverse to the beam 22. In some examples, the axis of rotation of the reel 32 is substantially perpendicular (±10 degrees) to the beam 22. In some examples, the reel 32 may be fixed to a structure other than the beam 22. In some examples, the reel 32 is fixed against longitudinal movement in the directions D1 and D2. A trough 34 is mounted to the beam 22 for supporting the hose 28 as the trolley 24 moves along the beam 22. In some examples, the trough 34 extends substantially the whole length of the beam 22.

In the example, the reel 32 is fixed against movement along the length of the beam 22, but the trolley 24 is movable along the length of the beam 22. The reel 32 is rotatable to allow for coiling and uncoiling of the hose 28 such that the hose 28 can extend with the trolley 24 as the trolley 24 is moved away from the reel 32 along the beam 22 but also stow the hose 28 as the hose 28 is moved nearer the reel 32. The reel 32 allows the hose to extend to desired positions of the trolley 24 while also stowing unnecessary hose to prevent interference, entanglement, etc.

In some examples, as shown, the management system 30 includes a guide post 36 including a perch 38 extending in a direction transverse to the beam 22 for guiding the hose 28 into the trough 34. The example trough 34 prevents entanglement or interference of the hose 28 with other components of the system by allowing the hose 28 to lay within it.

Figure 2:
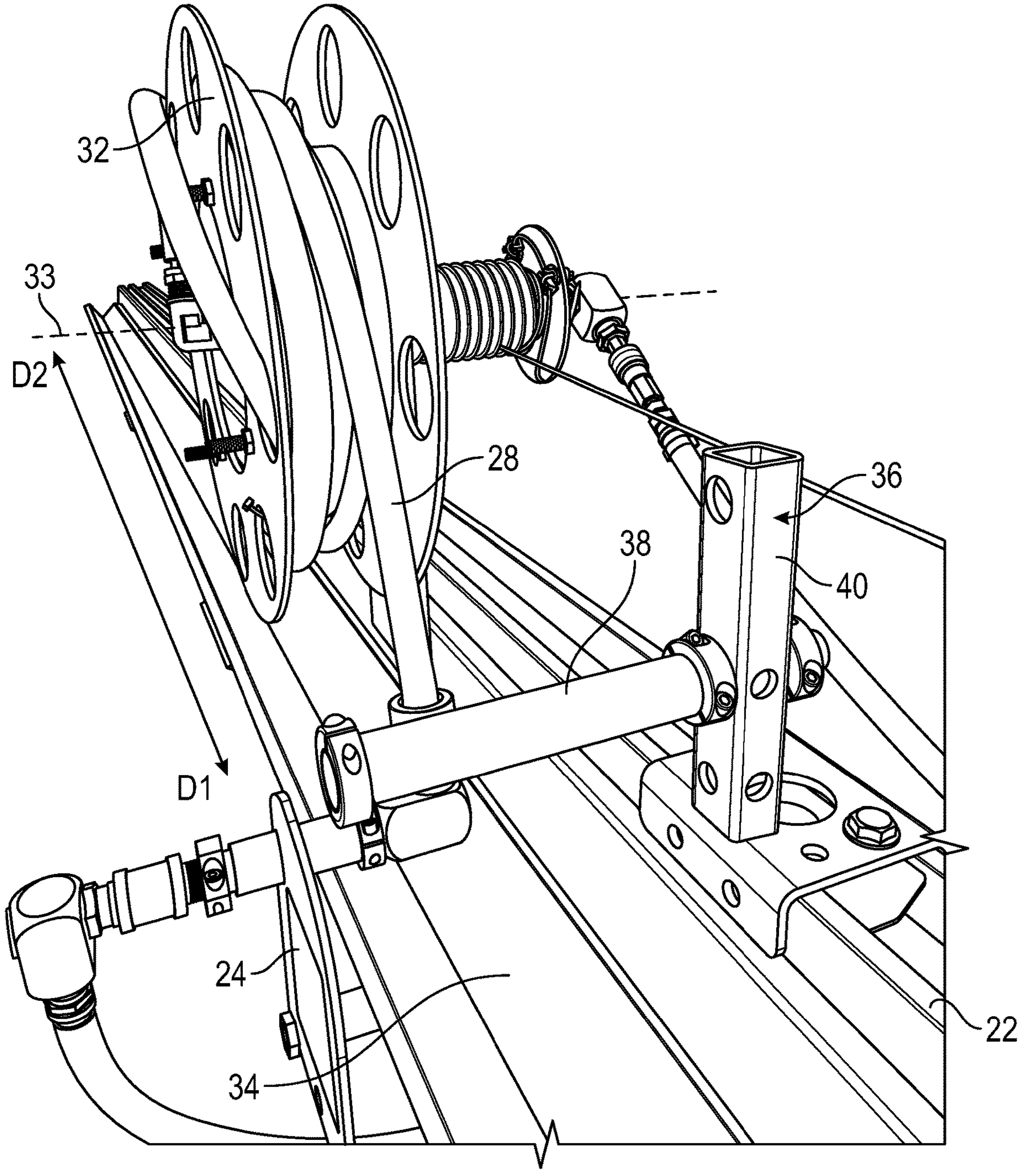
FIG. 2 illustrates another view of the example crane system.

FIG. 2 illustrates the example guide post 36, including a post 40 mounted to the beam 22 and a perch 38 extending from the post 40. The example perch 38 is above, and transverse to, the trough 34. As the trolley 24 is pulled in the direction D1 away from the reel 32, the reel 32 rotates in the clockwise direction, the hose 28 extends with the trolley 24 in the direction D1 (with respect to the FIG. 1 perspective), and the hose 28 slides under the perch 38 and is guided to rest within the trough 34.

Figure 3:
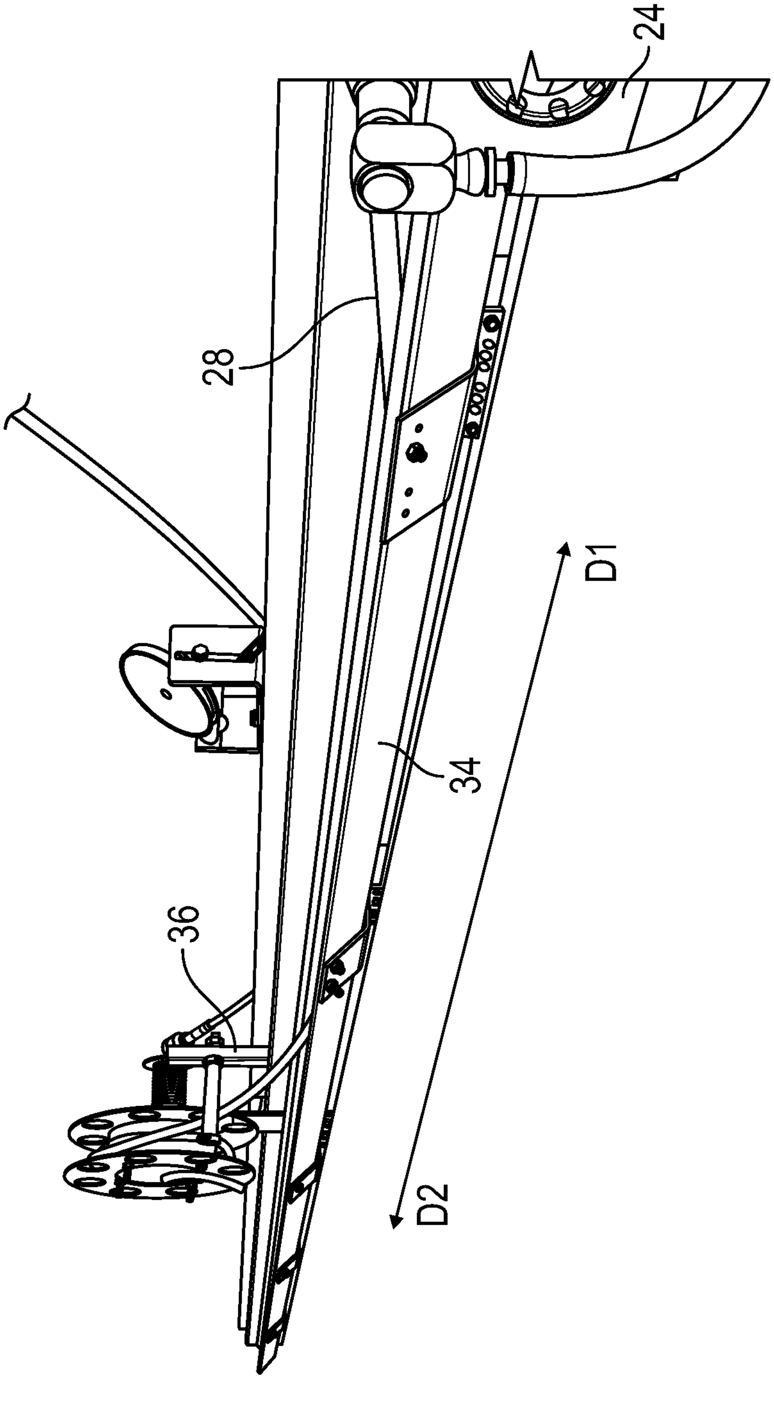
FIG. 3 illustrates another view of the example crane system.
Figure 4:
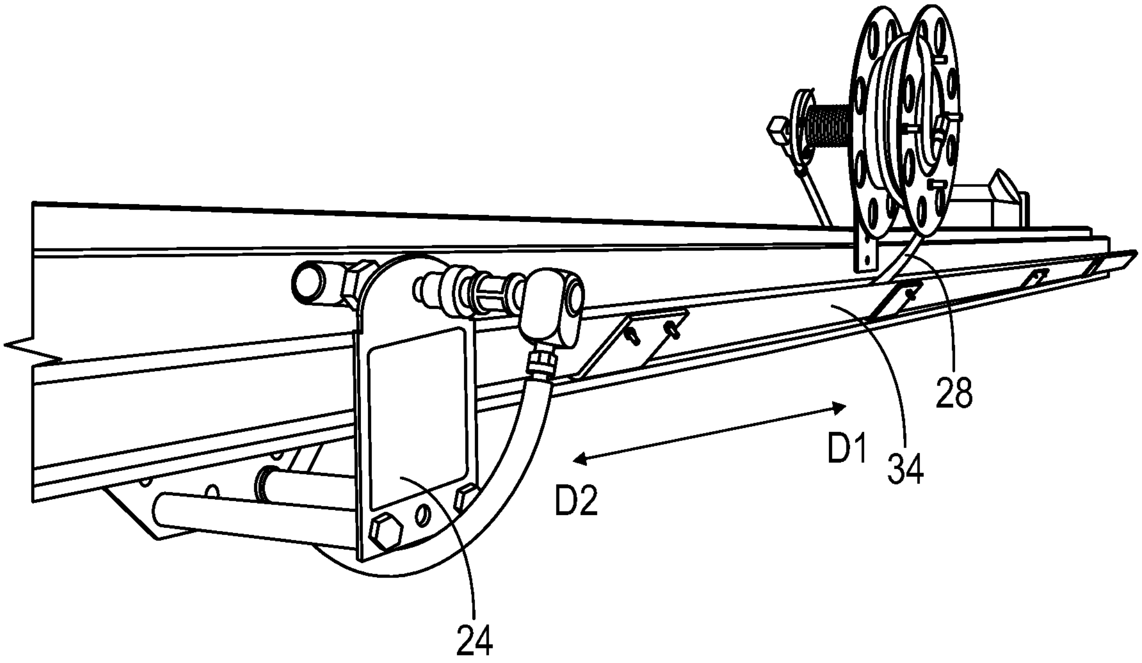
FIG. 4 illustrates another view of the example crane system.

Referring back to FIG. 1, in some examples, as shown, the reel 32 may be substantially centrally located relative to the beam 22, such that the trolley 24 can move along the beam 22 in a first direction D1 away from the reel 32, as shown in FIG. 3, and in a second direction D2 away from the reel 32 opposite the direction D1, as shown in FIG. 4, with the hose 28 remaining connected and moving with the trolley 24. The hose 28 is supported within the trough 34 as the trolley 24 extends in either direction D1, D2. In other examples, the reel 32 may not be centrally located relative to the beam 22 but still able to spin to allow the trolley 24 to move in the D1 and D2 directions.

As shown in FIG. 3, when the trolley 24 is moved in the direction D1 away from the reel 32, the reel 32 rotates in the clockwise direction, the hose 28 extends tangentially from the reel 32 near the top of the reel 32, such that the perch 38 guides the hose 28 down into the trough 34. As shown in FIG. 4, when the trolley 24 (hoist 26 removed from Figure for ease of viewing) is moved away from the reel 32 in a direction D2 away from the reel 32, the reel 32 rotates in the clockwise direction, and the hose 28 extends tangentially from the reel 32 near the bottom of the reel 32, such that a guide post is not utilized to guide the hose 28 downward into the trough 34. That is, in the example shown, a guide post 36 is provided at a position spaced in the direction D1 from the reel 32, but a guide post is not provided at opposite side of the reel 32 in the D2 direction.

In the example shown, with respect to the perspective shown in FIGS. 1-4, the reel 32 rotates in the clockwise direction when the hose is extended away from the reel 32, but rotates in the counterclockwise direction when the hose 28 is retracted back toward the reel 32.

Figure 5:
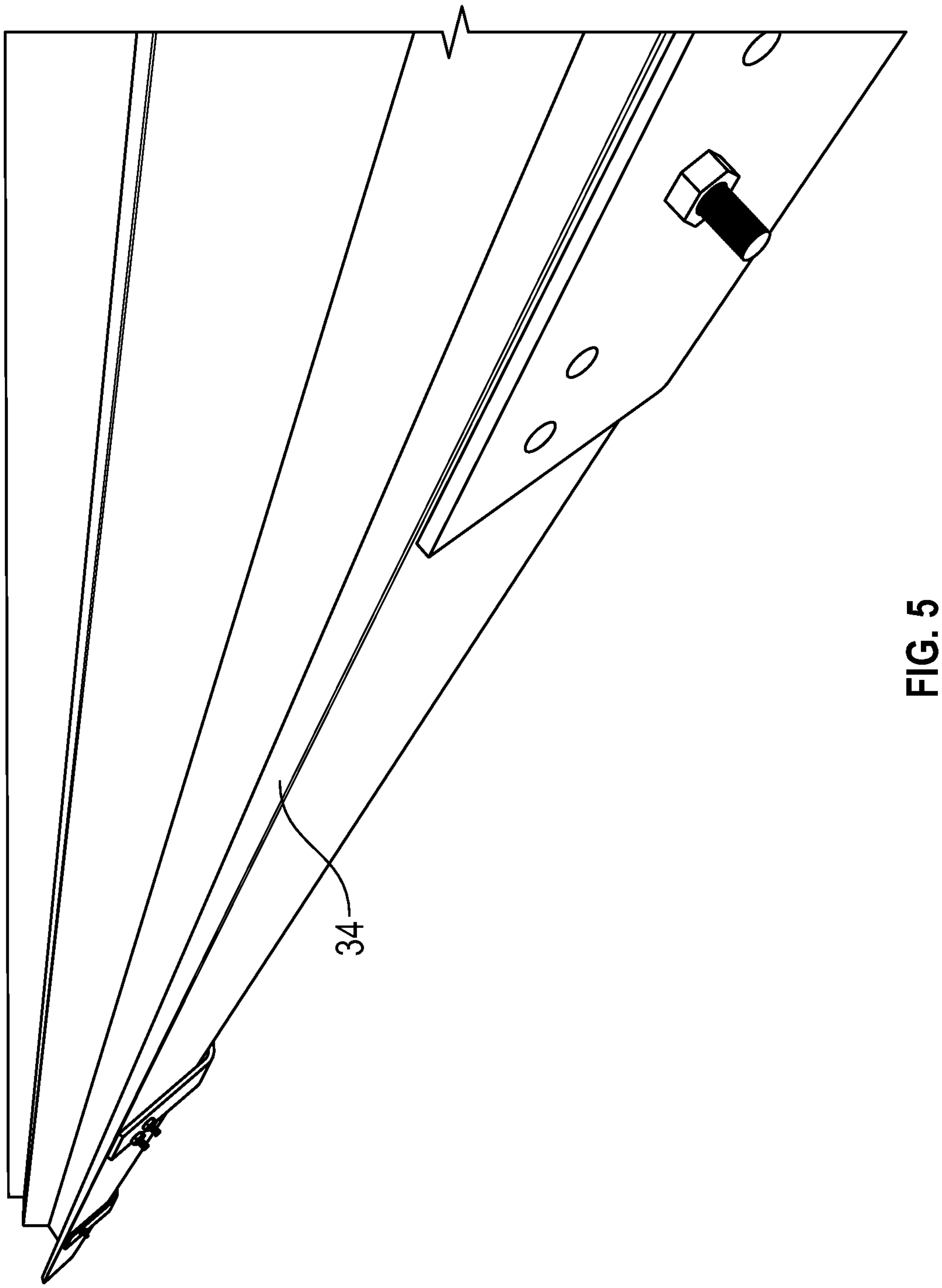
FIG. 5 illustrates another view of the example crane system.

As shown in FIG. 5, in some examples, the trough 34 is V-shaped in cross section when looking in the lengthwise direction (see also FIG. 8), such that the hose 28 may rest within the inside of the V. In some examples, the trough 34 includes ultra high molecular weight polyethylene or another low friction material to allow the hose 28 to slide within the trough 34.

Figure 6:
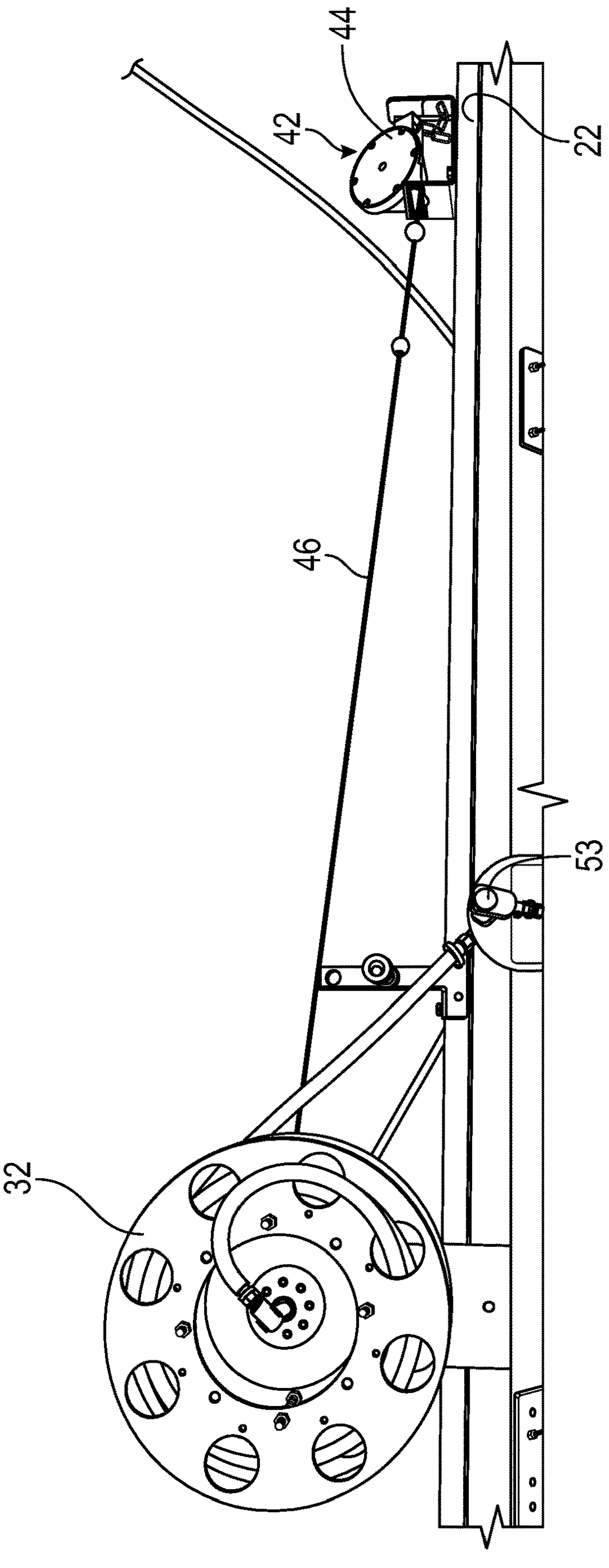
FIG. 6 illustrates another view of the example crane system.

As shown in FIG. 6, the management system 30 may include a load balancer 42 mounted to the beam 22. In other examples, the load balancer 42 may be mounted to an alternative fixed structure such that the load balancer 42 is fixed against longitudinal movement in the directions D1 and D2. The example load balancer 42 includes a counterbalance 44, and a cable 46 extending from the counterbalance 44 at a first end of the cable. The cable 46 is attached to the reel 32 at an end of the cable 46. In some examples, the load balancer 42 is a PACKERS KROMER™ Zero Gravity™ Tool Balancer or similar device.

Figure 7:
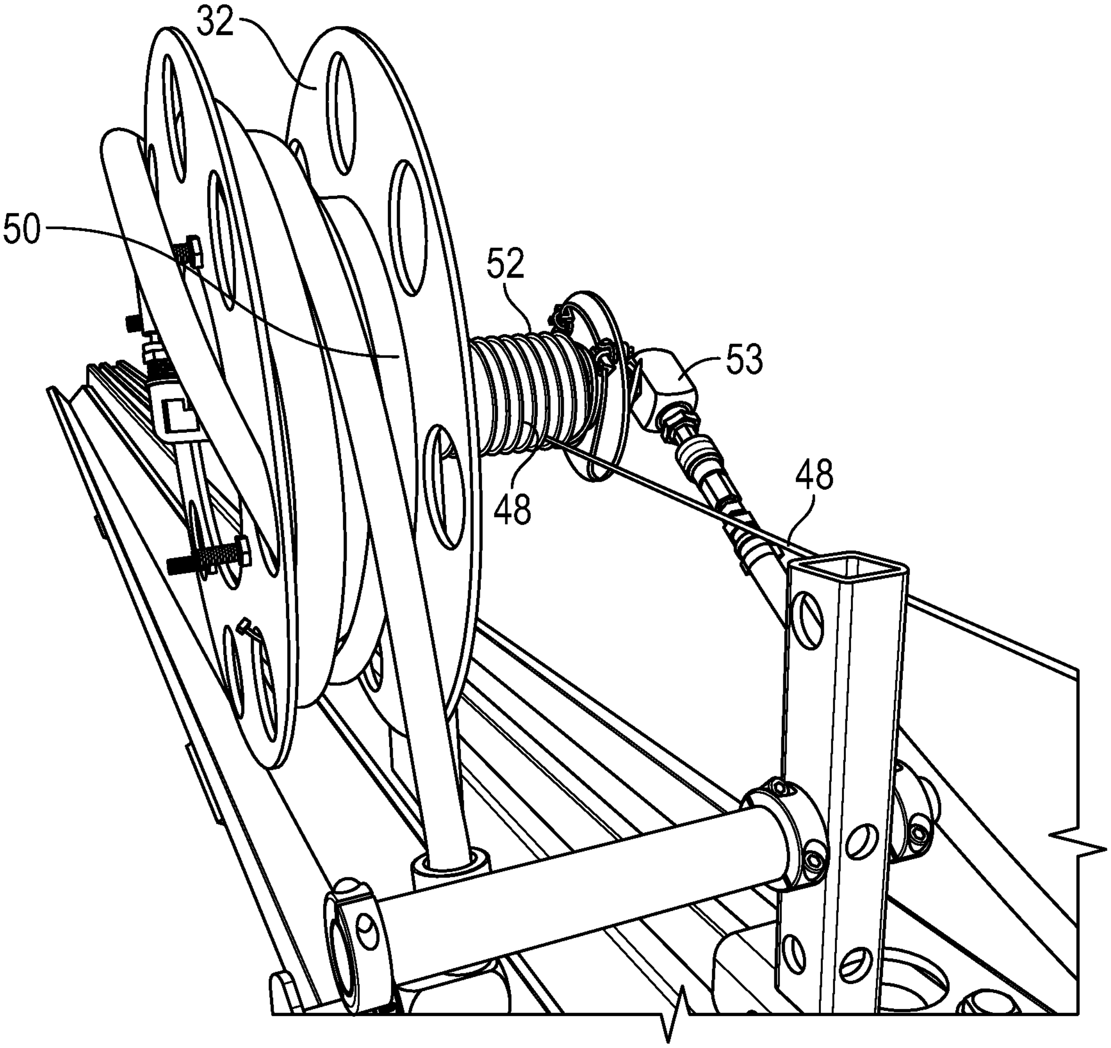
FIG. 7 illustrates another view of the example crane system.

FIG. 7 illustrates the attachment of the cable 46 to the reel 32. The reel 32 includes a cylinder 48 extending from, and rotating with, the barrel 50, and the cable 46 is attached to and configured to coil and uncoil around the cylinder 48 as the reel 32 rotates about its rotational axis. The cylinder 48 may include a helical groove 52 for receiving the coiling cable 46 in some examples. The hose 28 coils around the barrel 50 in the example shown. The example counterbalance 44 allows the hose 28 to be stowed and retracted when desired but also allows the trolley 24 to remain in place when at an extended position along the beam 22. That is, the trolley 24 does not have resistance or pullback from the cable 46.

The example reel 32 includes one or more ports for hose connection, such that the reel 32 provides part of the fluid path when hoses 28 are utilized. In some examples, one or more rotary unions 53 may be fluidly connected with the hose 28 at the reel 32 and/or the trolley 24 to provide fluid to a rotating component. In examples where electrical cables are utilized instead of hoses, one or more slip rings may be utilized for rotational connection.

Figure 8:
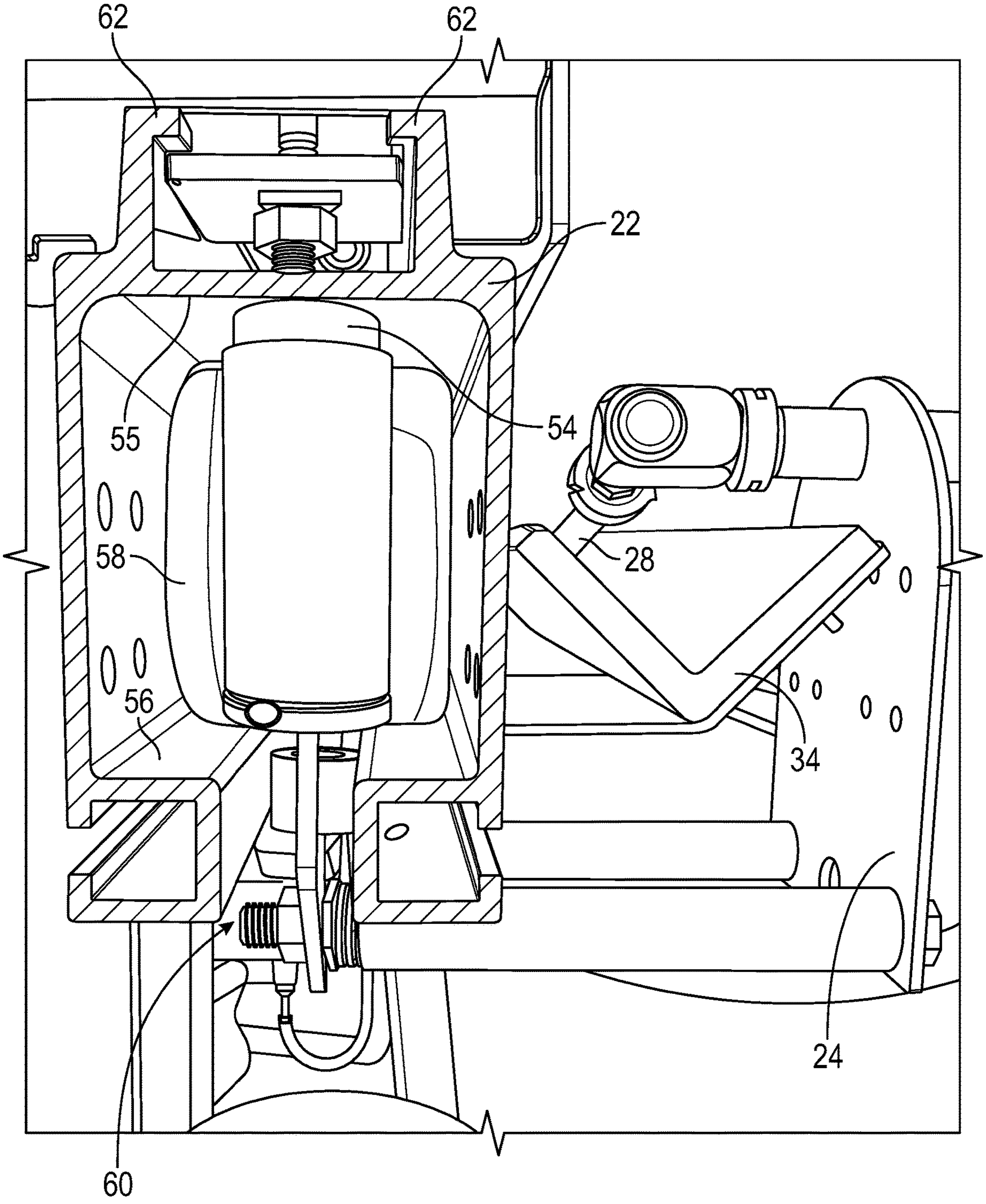
FIG. 8 illustrates a cross-sectional view of the example crane system.

As shown in FIG. 8, the trolley 24 may include a spring-loaded pad 54 biased to press against a surface of the beam 22. The pad 54 may provide friction so as to maintain the trolley 24 in a desired position when extended away from the reel 32. In some examples, the pad 54 is a cylindrical pad. In some examples, the pad 54 includes ultra high molecular weight polyethylene. In some examples, the pad 54 is biased against the upper inner surface 55 of the beam 22, as shown.

In some examples, as shown, the beam 22 provides an enclosed track 56, providing an internal rolling surface in the beam 22. Other track types may benefit from this disclosure. The trolley 24 includes one or more wheels 58 for rolling along the track 56, internal to the beam 22 in the illustrative example. The example beam 22 may provide an opening 60 near its bottom end and extending the length of the beam 22 to allow a portion of the trolley 24 to project therethrough below the track 56. At its upper end, the beam 22 may include one or more flanges or hooks 62 opposite the surface 55 for suspending the beam 22 from a support in some examples. Other beam types and shapes may benefit from this disclosure.

Figure 9:
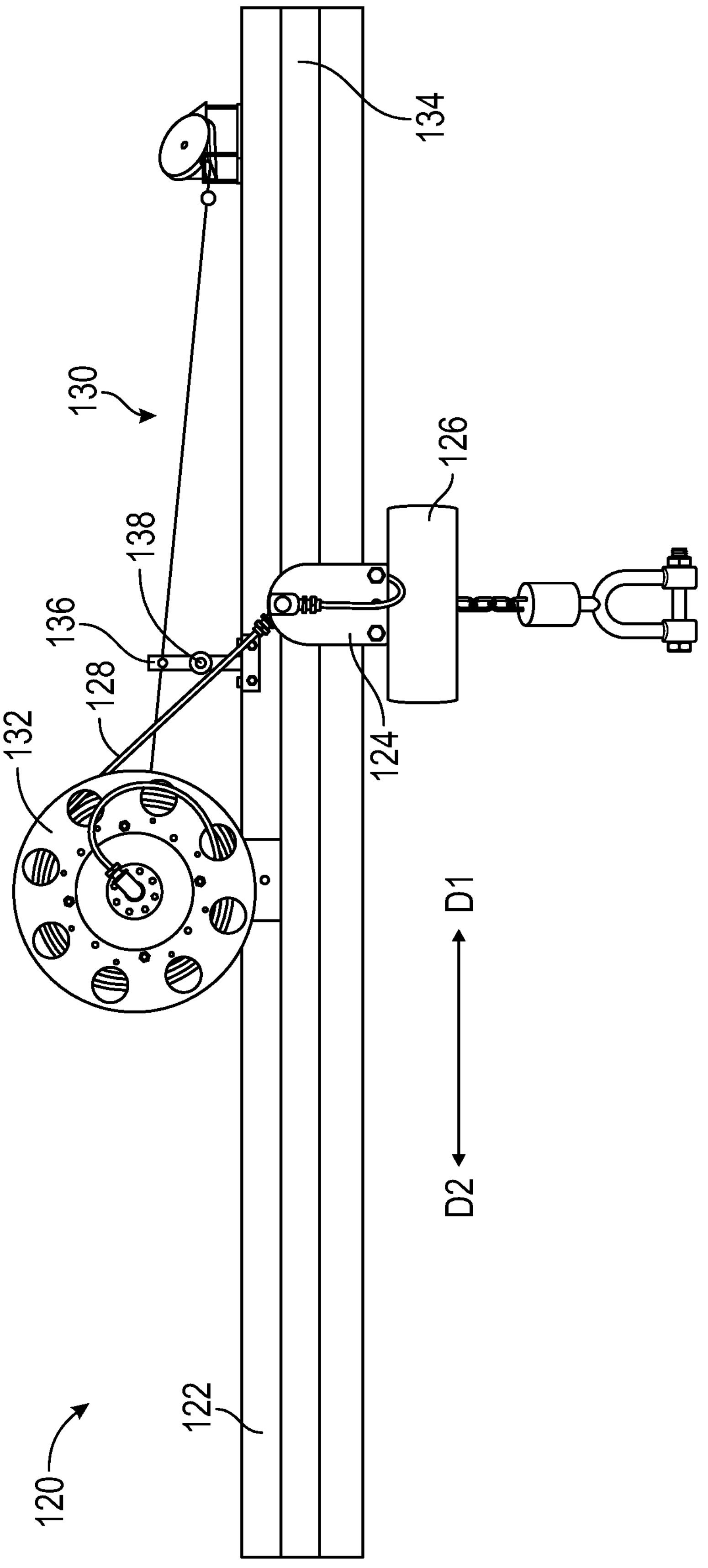
FIG. 9 illustrates another example crane system.

FIG. 9 illustrates another example crane system 120, substantially similar to the crane system 20, except that a cable 128, such as an electrical or ethernet cable in some examples, is utilized. It should be understood that like reference numerals identify corresponding or similar elements throughout the several drawings.

The systems and methods described herein prevent cable and hose entanglement, damage, or dislodging. The systems and methods further prevent interference with movement of the crane's components. The systems and methods provide for offers effortless movement without pullback on the trolley.

An example crane system may be said to include a beam, a trolley movable along the beam, and a hoist supported by the trolley. A cable or a hose connected with at least one of the hoist, the trolley, or a load supported by the hoist; and a management system for the cable or hose. The management system includes a reel mounted in a fixed position and receiving the cable or hose, and a trough mounted to the beam for supporting the cable or hose as the trolley moves along the beam.

An example method in accordance with one or more of the disclosed systems herein may be said to include providing a trolley movable along a beam and a hoist supported by the trolley, mounting a reel in a position fixed against longitudinal movement, and providing a hose or cable on the reel and connected with at least one of the hoist, the trolley, or a load supported by the hoist. The method may include attaching a trough to the beam for receiving the hose or cable, and attaching a load balancer cable to the reel. In some examples, the step of attaching the load balancer cable to the reel includes attaching the load balancer cable to a cylinder extending from a barrel of the reel. In some examples, the step of mounting the reel includes mounting the reel to the beam. In some examples, the method includes positioning a guide post including a perch to direct the hose or cable into the trough. In some examples, positioning the guide post step includes mounting the guide post to the beam. In some examples, the method includes mounting a guide post to the beam, the guide post including a perch to direct the hose or cable into the trough.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A crane system, comprising:
- a beam;
- a trolley movable longitudinally along the beam;
- a hoist supported by the trolley;
- a line connected with at least one of the hoist, the trolley, or a load supported by the hoist; and
- a management system for the line, including:
  - a reel mounted in a position fixed against longitudinal movement and for receiving the line,
  - a trough extending along the beam for supporting the line as the trolley moves along the beam, and
  - a load balancer including a counterbalance mounted in a position fixed against longitudinal movement and a load balancer cable attached to the reel.

2. The system of claim 1, wherein the trough is V-shaped in cross-section and comprises ultra high molecular weight polyethylene.

3. The system of claim 1, wherein the line is a pneumatic hose.

4. The system of claim 1, wherein the management system includes a guide post extending in a direction transverse to the beam for guiding the line into the trough.

5. The system of claim 1, wherein the load balancer cable is attached to a cylinder extending from a barrel of the reel.

6. The system of claim 5, wherein the cylinder includes a helical groove for the load balancer cable to coil within.

7. The system of claim 1, wherein the load balancer is mounted to the beam.

8. The system of claim 1, wherein the reel is mounted to the beam.

9. The system of claim 1, wherein the beam provides an enclosed track, and the trolley includes a pad spring loaded to contact an interior surface of the beam.

10. The system of claim 1, wherein the counterbalance is spaced longitudinally from the reel.

11. A method of managing a line, the method comprising:
- positioning a trolley movable along a beam and a hoist supported by the trolley;
- mounting a reel in a position fixed against longitudinal movement;
- connecting a line on the reel with at least one of the hoist, the trolley, or a load supported by the hoist;
- positioning a trough along the beam for receiving the line; and
- mounting a load balancer including a counterbalance and a load balancer cable, wherein mounting the load balancer comprises mounting the counterbalance in a position fixed against longitudinal movement and attaching the load balancer cable to the reel.

12. The method of claim 11, wherein the step of attaching the load balancer cable to the reel includes attaching the load balancer cable to a cylinder extending from a barrel of the reel.

13. The method of claim 11, wherein the step of mounting the reel includes mounting the reel to the beam.

14. The method of claim 11, wherein the trough is V-shaped in cross section.

15. The method of claim 11, the method comprising:
- positioning a guide having a surface to direct the line downward into the trough.

16. A crane system, comprising:
- a beam;
- a trolley movable longitudinally along the beam;
- a hoist supported by the trolley;

a line connected with at least one of the hoist, the trolley, or a load supported by the hoist; and a management system for the line, including:

a reel mounted in a position fixed against longitudinal movement and for receiving the line, wherein the reel is substantially centrally located relative to the beam, and the trolley is movable in a first direction and an opposite second direction away from the reel, with the line remaining connected with the hoist, the trolley, or the load, a trough extending along the beam for supporting the line as the trolley moves along the beam, and a load balancer including a counterbalance spaced longitudinally from the reel and a load balancer cable attached to the reel.

17. The system of claim 16, comprising a guide positioned to direct the line into the trough.

18. A crane system, comprising:

a beam;

a trolley movable longitudinally along the beam, wherein the beam provides an enclosed track, and the trolley includes a pad spring loaded to contact an interior surface of the beam;

a hoist supported by the trolley;

a line connected with at least one of the hoist, the trolley, or a load supported by the hoist; and a management system for the line, including:

a reel mounted in a position fixed against longitudinal movement and for receiving the line, wherein the reel is substantially centrally located relative to the beam, and the trolley is movable in a first direction and an opposite second direction away from the reel, with the line remaining connected with the hoist, the trolley, or the load, a trough extending along the beam for supporting the line as the trolley moves along the beam.

* * * * *